United States Patent
Wakasa et al.

(10) Patent No.: US 7,692,322 B2
(45) Date of Patent: Apr. 6, 2010

(54) WIND TURBINE GENERATOR, ACTIVE DAMPING METHOD THEREOF, AND WINDMILL TOWER

(75) Inventors: Tsuyoshi Wakasa, Nagasaki (JP); Kazunari Ide, Nagasaki (JP); Yoshiyuki Hayashi, Nagasaki (JP); Masaaki Shibata, Nagasaki (JP)

(73) Assignee: Mitsubishi Heavy Industries, Ltd. (JP)

( * ) Notice: Subject to any disclaimer, the term of this patent is extended or adjusted under 35 U.S.C. 154(b) by 565 days.

(21) Appl. No.: 10/590,328

(22) PCT Filed: Nov. 12, 2004

(86) PCT No.: PCT/JP2004/016851

§ 371 (c)(1),
(2), (4) Date: Jun. 25, 2007

(87) PCT Pub. No.: WO2005/083266

PCT Pub. Date: Sep. 9, 2005

(65) Prior Publication Data

US 2008/0206051 A1 Aug. 28, 2008

(30) Foreign Application Priority Data

Feb. 27, 2004 (JP) ............................... 2004-055515

(51) Int. Cl.
*H02P 9/04* (2006.01)
*F03D 9/00* (2006.01)
(52) U.S. Cl. .......................................... 290/44; 290/55
(58) Field of Classification Search .................... 290/44, 290/55
See application file for complete search history.

(56) References Cited

U.S. PATENT DOCUMENTS 3,998,406 A * 12/1976 Smith et al. ................. 244/3.14

(Continued)

FOREIGN PATENT DOCUMENTS

JP 58-178885 A 10/1983

(Continued)

OTHER PUBLICATIONS

The Canadian Office Action dated Jul. 7, 2009.

*Primary Examiner*—T C Patel
*Assistant Examiner*—Pedro J Cuevas
(74) *Attorney, Agent, or Firm*—Kanesaka Berner and Partners, LLP

(57) ABSTRACT

A wind turbine generator, an active damping method thereof, and a windmill tower in which vibrations of the wind turbine generator itself or the windmill tower can be reduced at low cost are provided. The acceleration due to vibrations of a nacelle (13) is detected with an accelerometer (17) attached to the nacelle (13). In an active damping unit (20), a pitch angle of windmill blades (12) for generating a thrust on the windmill blades (12) so as to cancel out the vibrations of the nacelle (13) is calculated on the basis of the acceleration, and the pitch angle is output as a blade-pitch-angle command $\delta\theta^*$ for damping. On the other hand, in a pitch-angle control unit (30), a pitch angle of the windmill blades (12) for controlling the output to be a predetermined value is calculated, and the pitch angle is output as a blade-pitch-angle command $\theta^*$ for output control. The blade-pitch-angle command $\delta\theta^*$ for damping is combined with the blade-pitch-angle command $\theta^*$ for output control using a subtracter (40). The pitch angle of the windmill blades is controlled on the basis of the resulting blade-pitch-angle command after combining.

13 Claims, 10 Drawing Sheets

U.S. PATENT DOCUMENTS

| | | | | |
|---|---|---|---|---|
| 4,160,170 | A * | 7/1979 | Harner et al. | 290/44 |
| 4,161,658 | A * | 7/1979 | Patrick | 290/44 |
| 4,189,648 | A * | 2/1980 | Harner | 290/44 |
| 4,193,005 | A * | 3/1980 | Kos et al. | 290/44 |
| 4,410,806 | A * | 10/1983 | Brulle | 290/44 |
| 4,420,692 | A * | 12/1983 | Kos et al. | 290/44 |
| 4,435,647 | A | 3/1984 | Harner et al. | 290/44 |
| 5,083,039 | A * | 1/1992 | Richardson et al. | 290/44 |
| 5,225,712 | A * | 7/1993 | Erdman | 290/44 |
| 5,284,418 | A * | 2/1994 | Moriya | 416/35 |
| 5,289,041 | A * | 2/1994 | Holley | 290/44 |
| 5,648,902 | A * | 7/1997 | Honda | 701/29 |
| 5,777,225 | A * | 7/1998 | Sada et al. | 73/488 |
| 5,790,404 | A * | 8/1998 | Faye et al. | 701/45 |
| 5,833,156 | A * | 11/1998 | Park et al. | 242/289 |
| 5,978,600 | A * | 11/1999 | Takeuchi et al. | 396/53 |
| 5,987,369 | A * | 11/1999 | Kwak et al. | 701/37 |
| 6,343,248 | B1 | 1/2002 | Rizzotto et al. | 701/40 |
| 6,356,856 | B1 | 3/2002 | Damen et al. | 702/160 |
| 6,382,018 | B2 * | 5/2002 | Knestel | 73/117.01 |
| 6,751,535 | B2 * | 6/2004 | Mori | 701/23 |
| 6,914,404 | B2 * | 7/2005 | Kaku et al. | 318/568.22 |
| 6,940,185 | B2 * | 9/2005 | Andersen et al. | 290/44 |
| 7,071,578 | B1 * | 7/2006 | Shibata et al. | 290/55 |
| 7,309,930 | B2 * | 12/2007 | Suryanarayanan et al. | 290/55 |
| 7,317,260 | B2 * | 1/2008 | Wilson | 290/44 |
| 7,342,323 | B2 * | 3/2008 | Avagliano et al. | 290/55 |
| 7,347,667 | B2 * | 3/2008 | Wobben | 416/1 |
| 7,400,055 | B2 * | 7/2008 | Nagao | 290/44 |
| 7,417,332 | B2 * | 8/2008 | Malakhova et al. | 290/44 |
| 7,423,352 | B2 * | 9/2008 | Suryanarayanan et al. | 290/55 |
| 7,425,774 | B2 * | 9/2008 | Shibata et al. | 290/55 |
| 7,425,775 | B2 * | 9/2008 | Shibata et al. | 290/55 |
| 7,436,083 | B2 * | 10/2008 | Shibata et al. | 290/44 |
| 7,436,085 | B2 * | 10/2008 | Shibata et al. | 290/55 |
| 7,452,185 | B2 * | 11/2008 | Ide et al. | 416/35 |
| 7,476,985 | B2 * | 1/2009 | Llorente Gonzalez | 290/44 |
| 2002/0002860 | A1 * | 1/2002 | Knestel | 73/121 |
| 2002/0038178 | A1 * | 3/2002 | Talkenberg et al. | 701/200 |
| 2002/0099481 | A1 * | 7/2002 | Mori | 701/23 |
| 2004/0108729 | A1 * | 6/2004 | Wobben | 290/44 |
| 2004/0253093 | A1 * | 12/2004 | Shibata et al. | 415/4.1 |
| 2005/0200134 | A1 * | 9/2005 | Shibata et al. | 290/55 |
| 2005/0200135 | A1 * | 9/2005 | Shibata et al. | 290/55 |
| 2005/0207889 | A1 * | 9/2005 | Shibata et al. | 416/132 B |
| 2005/0207890 | A1 * | 9/2005 | Shibata et al. | 416/132 B |
| 2006/0033338 | A1 * | 2/2006 | Wilson | 290/44 |
| 2006/0066111 | A1 * | 3/2006 | Suryanarayanan et al. | 290/44 |
| 2006/0140761 | A1 * | 6/2006 | LeMieux | 416/61 |
| 2007/0018457 | A1 * | 1/2007 | Llorente Gonzalez | 290/44 |
| 2007/0041837 | A1 * | 2/2007 | Ide et al. | 416/147 |
| 2007/0075546 | A1 * | 4/2007 | Avagliano et al. | 290/44 |
| 2007/0114799 | A1 * | 5/2007 | Riesberg et al. | 290/55 |
| 2007/0176428 | A1 * | 8/2007 | Nagao | 290/44 |
| 2007/0182162 | A1 * | 8/2007 | McClintic | 290/55 |
| 2008/0067815 | A1 * | 3/2008 | Suryanarayanan et al. | 290/44 |
| 2008/0069693 | A1 * | 3/2008 | Malakhova et al. | 416/61 |
| 2008/0084068 | A1 * | 4/2008 | Shibata et al. | 290/44 |
| 2008/0133171 | A1 * | 6/2008 | Feichtinger et al. | 702/141 |
| 2008/0262787 | A1 * | 10/2008 | Malakhova et al. | 702/145 |
| 2008/0306707 | A1 * | 12/2008 | Vock et al. | 702/141 |
| 2009/0036762 | A1 * | 2/2009 | Tateda et al. | 600/336 |
| 2009/0058086 | A1 * | 3/2009 | Arinaga et al. | 290/44 |
| 2009/0066089 | A1 * | 3/2009 | Arinaga et al. | 290/55 |
| 2009/0162202 | A1 * | 6/2009 | Nies et al. | 416/147 |
| 2009/0180875 | A1 * | 7/2009 | Egedal et al. | 416/43 |
| 2009/0200804 | A1 * | 8/2009 | Nielsen et al. | 290/44 |
| 2009/0246020 | A1 * | 10/2009 | Nielsen et al. | 416/1 |
| 2009/0250932 | A1 * | 10/2009 | Egedal | 290/44 |
| 2009/0257873 | A1 * | 10/2009 | Egedal et al. | 416/1 |
| 2009/0263245 | A1 * | 10/2009 | Shi et al. | 416/43 |
| 2009/0266160 | A1 * | 10/2009 | Jeffrey et al. | 73/455 |

FOREIGN PATENT DOCUMENTS

| | | |
|---|---|---|
| JP | 58178885 | 10/1983 |
| JP | 63-75263 A | 4/1988 |
| JP | 63075263 | 4/1988 |
| JP | 2-80771 A | 3/1990 |
| JP | 2080771 | 3/1990 |
| JP | 08-021128 | 1/1996 |
| JP | 8-21128 A | 1/1996 |
| JP | 2001-221145 A | 8/2001 |
| JP | 2002-509222 A | 3/2002 |
| JP | 2002509222 | 3/2002 |
| KR | 10-2007-0026362 | 3/2007 |
| KR | 20070026362 | 3/2007 |

* cited by examiner

US 7,692,322 B2

WIND TURBINE GENERATOR, ACTIVE DAMPING METHOD THEREOF, AND WINDMILL TOWER

TECHNICAL FIELD

The present invention relates to wind turbine generators, active damping methods thereof, and windmill towers in which vibrations induced by fluctuations of wind speed can be suppressed. In particular, the present invention relates to wind turbine generators, active damping methods thereof, and windmill towers in which vibrations of the wind turbine generators themselves or the windmill towers can be reduced at low cost and without increasing the weight of a nacelle.

BACKGROUND ART

Wind turbine generators generally have a structure in which heavy objects such as blades, a gearbox, and a generator are provided at the top of a cylindrical tower having a height of several tens of meters; therefore, vibrations induced by fluctuations of wind speed are extremely large. Such vibrations increase the fatigue loading of structural components, resulting in a decrease in the life of the windmill tower.

Recently, the size of wind turbine generators has been increased. As the size of the generators increases, the effect of vibrations induced by fluctuations of wind speed becomes more significant. Thus, reducing the vibrations in wind turbine generators or windmill towers is a critical technical problem.

On the other hand, in tall structures such as high-rise buildings, active damping techniques are used in order to improve the living conditions during strong winds. Various methods have been proposed, but most of them involve driving a heavy object (mass) provided on the upper part of the structure with an actuator such as a motor to absorb the vibrations of the structure itself; one example is an active mass damper (AMD).

However, when the active damping technique (AMD) used in high-rise structures and the like is directly applied to wind turbine generators or windmill powers without modification, the following problems occur.

First, in order to achieve a satisfactory damping effect, a considerably heavy object (mass) is necessary. Furthermore, in order to drive this considerably heavy object, an actuator having a large capacity must be provided. Consequently, the weight of the nacelle significantly increases.

Secondly, since the weight of the nacelle disposed at the top of a windmill tower increases, the strength of the windmill tower supporting the nacelle must be increased accordingly. This need to significantly increase the strength of the windmill tower and other components increases the total cost of the wind turbine generator and the windmill tower.

Thirdly, an actuator for driving the heavy object (mass) is necessary. Accordingly, the number of parts for driving is increased, resulting in increased maintenance costs.

To solve the above problems, for example, Japanese Unexamined Patent Application Publication No. 2001-221145 (Patent Document 1) discloses a technique in which vibrations of a windmill tower are suppressed by providing a passive-active pitch-flap mechanism.

[Patent Document 1]
Japanese Unexamined Patent Application Publication No. 2001-221145

DISCLOSURE OF INVENTION

However, the invention described in Patent Document 1 ultimately employs a method of reducing vibrations of the windmill tower using a mechanical mechanism. Therefore, this method is no different from the known AMD method, resulting in an increase in the weight of the nacelle. Furthermore, a plurality of structures are included, resulting in problems such as an increase in the size of the nacelle and an increase in the cost.

The present invention has been made in order to solve the above problems, and an object of the present invention is to provide wind turbine generators, active damping methods thereof, and windmill towers in which vibrations can be reduced at low cost and without increasing the weight of the nacelle.

In order to solve the above problems, the present invention provides the following solutions.

The present invention provides a wind turbine generator including a pitch-angle control mechanism for controlling a pitch angle of windmill blades on the basis of a blade-pitch-angle command, wherein the wind turbine generator includes an accelerometer, attached to a nacelle, for detecting the acceleration due to vibrations of the nacelle; and an active damping unit for calculating a pitch angle of the windmill blades for generating a thrust on the windmill blades so as to cancel out the vibrations of the nacelle on the basis of the acceleration detected with the accelerometer and for outputting a blade-pitch-angle command to the pitch-angle control mechanism.

According to the present invention, the acceleration due to vibrations of the nacelle is detected with the accelerometer attached to the nacelle, a pitch angle of the windmill blades for generating a thrust on the windmill blades so as to cancel out the vibrations of the nacelle is calculated in the active damping unit on the basis of the acceleration, and the pitch angle is output as a blade-pitch-angle command to the pitch-angle control mechanism, thereby controlling the pitch angle of the windmill blades. In this case, the drag acting on the windmill blade acts as a thrust in the front-rear direction of the nacelle, and the magnitude of the thrust varies depending on wind speed and the pitch angle of the windmill blade. Accordingly, when the pitch angle is controlled on the basis of a predetermined control rule, vibrations in the front-rear direction of the nacelle can be controlled to some extent.

The present invention also provides a wind turbine generator including a pitch-angle control mechanism for controlling a pitch angle of windmill blades on the basis of a blade-pitch-angle command, wherein the wind turbine generator includes an accelerometer, attached to a nacelle, for detecting the acceleration due to vibrations of the nacelle; an active damping unit for calculating a pitch angle of the windmill blades for generating a thrust on the windmill blades so as to cancel out the vibrations of the nacelle on the basis of the acceleration detected with the accelerometer and for outputting a blade-pitch-angle command for damping; a pitch-angle control unit for calculating a pitch angle of the windmill blades for controlling the output of the wind turbine generator to be a predetermined value on the basis of wind speed, the rotational speed of a windmill rotor, or the output of the wind turbine generator and for outputting a blade-pitch-angle command for output control; and an adder for supplying the pitch-angle control mechanism with a blade-pitch-angle command obtained by combining the blade-pitch-angle command for damping output from the active damping unit with the blade-pitch-angle command for output control output from the pitch-angle control unit.

According to the present invention, the acceleration due to vibrations of the nacelle is detected with the accelerometer attached to the nacelle. A pitch angle of the windmill blades for generating a thrust on the windmill blades so as to cancel out the vibrations of the nacelle is calculated in the active damping unit on the basis of the acceleration, and the pitch angle is output as a blade-pitch-angle command for damping. On the other hand, a pitch angle of the windmill blades for controlling the output to be a predetermined value is calculated in the pitch-angle control unit, and the pitch angle is output as a blade-pitch-angle command for output control. The blade-pitch-angle command for damping is combined with the blade-pitch-angle command for output control by the adder. Thus, the pitch angle of the windmill blades is controlled on the basis of the resulting blade-pitch-angle command after combining.

Since the technique of pitch-angle control has been widely employed to date for the purpose of output control, the present invention can be realized by merely additionally mounting the accelerometer, the active damping unit, and the adder on an existing wind turbine generator. Accordingly, the cost of installing and operating the active damping control can be markedly reduced, and thus vibrations of the wind turbine generator can be reduced at low cost. Furthermore, since the pitch-angle control is performed by combining the blade-pitch-angle command for damping with the blade-pitch-angle command for output control, output control and damping control can be achieved at the same time.

In the wind turbine generator of the present invention, the active damping unit preferably includes a speed estimation unit for estimating a speed from the acceleration detected with the accelerometer, and a control unit for calculating a pitch angle of the windmill blades for generating a thrust on the windmill blades so as to cancel out the vibrations of the nacelle on the basis of the speed output from the speed estimation unit.

According to this invention, in the active damping unit, the speed estimation unit estimates a speed from the acceleration detected with the accelerometer. The control unit then calculates a pitch angle of the windmill blades for generating a thrust on the windmill blades so as to cancel out the vibrations of the nacelle on the basis of the estimated speed.

Since the active damping unit can be realized by a simple structure including the speed estimation unit and the control unit, vibrations of the wind turbine generator can be reduced at low cost.

In the wind turbine generator of the present invention, the speed estimation unit preferably integrates the acceleration detected with the accelerometer to calculate the speed.

Since the speed estimation unit integrates the acceleration detected with the accelerometer to calculate the speed, noise in the high-frequency band can be removed. Thereby, the control unit in the subsequent stage can perform stable and effective damping control.

In the wind turbine generator of the present invention, the control unit preferably includes a phase-lead compensator for advancing the phase of the speed output from the speed estimation unit by a predetermined amount, and preferably calculates the pitch angle on the basis of the speed obtained after the phase-lead compensation.

Furthermore, the control unit preferably includes a phase-lag compensator for delaying the phase of the speed output from the phase-lead compensator by a predetermined amount, and preferably calculates the pitch angle on the basis of the speed obtained after the phase-lag compensation.

According to this invention, the pitch angle is calculated on the basis of the speed obtained after the phase-lag compensation. Since the phase-lag of the output of the accelerometer can be compensated for and noise in the high-frequency band can be reduced, stable and effective damping control can be performed.

In the wind turbine generator of the present invention, the control unit preferably includes any one of a proportional controller, a proportional-integral controller, a proportional-integral-derivative controller, a linear-quadratic regulator, and a linear-quadratic Gaussian regulator to which the speed estimated by the speed estimation unit is input to calculate the pitch angle.

When the control unit has such a structure, stable and effective damping control can be performed.

In the wind turbine generator of the present invention, the active damping unit preferably includes a limiter for limiting the pitch angle of the windmill blades or the angular speed of the pitch angle of the windmill blades to a predetermined range.

According to this invention, the active damping unit, more specifically, the control unit provided in the active damping unit, includes a limiter for limiting the pitch angle of the windmill blades or the angular speed (rate of change) of the pitch angle of the windmill blades to a predetermined range. Therefore, fatigue of the pitch-angle control mechanism can be reduced, and problems due to errors in setting the parameters or the like can be prevented.

Furthermore, when the blade-pitch-angle command for damping is limited to a much smaller range than the blade-pitch-angle command for output control, effects caused by interference of both command values can be decreased or prevented.

The present invention provides an active damping method of a wind turbine generator including a pitch-angle control mechanism for controlling a pitch angle of windmill blades on the basis of a blade-pitch-angle command, and an accelerometer, attached to a nacelle, for detecting the acceleration due to vibrations of the nacelle, the active damping method including an active damping step of calculating a pitch angle of the windmill blades for generating a thrust on the windmill blades so as to cancel out the vibrations of the nacelle on the basis of the acceleration detected with the accelerometer and outputting a blade-pitch-angle command to the pitch-angle control mechanism.

According to the present invention, the accelerometer attached to the nacelle detects the acceleration due to vibrations of the nacelle, a pitch angle of the windmill blades for generating a thrust on the windmill blades so as to cancel out the vibrations of the nacelle is calculated in the active damping step on the basis of the acceleration, and the pitch angle is output as a blade-pitch-angle command to the pitch-angle control mechanism, thereby controlling the pitch angle of the windmill blades. Thus, the control can be realized by the accelerometer, hardware of the pitch-angle control mechanism, and software of the active damping step. Therefore, the cost of installing and operating the active damping control can be markedly reduced, and vibrations of the wind turbine generator can be reduced at low cost.

The present invention provides an active damping method of a wind turbine generator including a pitch-angle control mechanism for controlling a pitch angle of windmill blades on the basis of a blade-pitch-angle command, and an accelerometer, attached to a nacelle, for detecting the acceleration due to vibrations of the nacelle, the active damping method including an active damping step of calculating a pitch angle of the windmill blades for generating a thrust on the windmill blades so as to cancel out the vibrations of the nacelle on the basis of the acceleration detected with the accelerometer and outputting a blade-pitch-angle command for damping; a pitch-angle control step of calculating a pitch angle of the windmill blades for controlling the output of the wind turbine generator to be a predetermined value on the basis of wind speed, the rotational speed of a windmill rotor, or the output of the wind turbine generator and outputting a blade-pitch-angle command for output control; and an addition step of supplying the pitch-angle control mechanism with a blade-pitch-angle command obtained by combining the blade-pitch-angle command for damping in the active damping step with the blade-pitch-angle command for output control in the pitch-angle control step.

According to this invention, an accelerometer attached to the nacelle detects the acceleration due to vibrations of the nacelle, and a pitch angle of the windmill blades for generating a thrust on the windmill blades so as to cancel out the vibrations of the nacelle is calculated in the active damping step on the basis of the acceleration to output the pitch angle as a blade-pitch-angle command for damping. On the other hand, a pitch angle of the windmill blades for controlling the output to be a predetermined value is calculated in the pitch-angle control step to output a blade-pitch-angle command for output control. The blade-pitch-angle command for damping is combined with the blade-pitch-angle command for output control in the addition step, and the pitch angle of the windmill blades is controlled on the basis of the resulting blade-pitch-angle command after combining. Since the technique of pitch-angle control has been widely employed to date for the purpose of output control, the present invention can be realized merely adding the active damping step and the addition step to existing control software on a wind turbine generator.

Thus, since the control can be realized by mounting the accelerometer and adding the software, the cost of installing and operating the active damping control can be markedly reduced, and vibrations of the wind turbine generator can be reduced at low cost. Furthermore, since the pitch-angle control is performed by combining the blade-pitch-angle command for damping with the blade-pitch-angle command for output control, output control and damping control can be achieved at the same time.

In the active damping method of a wind turbine generator of the present invention, the active damping step preferably includes a speed estimation step of estimating a speed from the acceleration detected with the accelerometer, and a control step of calculating a pitch angle of the windmill blades for generating a thrust on the windmill blades so as to cancel out the vibrations of the nacelle on the basis of the speed estimated in the speed estimation step.

According to this invention, in the active damping step, a speed is determined in the speed estimation step on the basis of the acceleration detected with the accelerometer, and a pitch angle of the windmill blades for generating a thrust on the windmill blades so as to cancel out the vibrations of the nacelle is calculated in the control step on the basis of the speed. Since the active damping step can be realized by a simple structure including the speed estimation step and the control step, vibrations of the wind turbine generator can be reduced at low cost.

In the active damping method of a wind turbine generator of the present invention, the speed estimation step preferably integrates the acceleration detected with the accelerometer to calculate the speed.

Since noise in the high-frequency band can be removed by the speed estimation step, stable and effective damping control can be performed in the active damping step.

In the active damping method of a wind turbine generator of the present invention, the control step preferably includes a phase-lead compensation step of advancing the phase of the speed output from the speed estimation step by a predetermined amount and calculates the pitch angle on the basis of the speed obtained after the phase-lead compensation.

In the active damping method of a wind turbine generator of the present invention, the control step preferably includes a phase-lag compensation step of delaying the phase of the speed output from the phase-lead compensation step by a predetermined amount and calculates the pitch angle on the basis of the speed obtained after the phase-lag compensation.

According to this invention, the control step includes a phase-lead compensation step of advancing the phase of the speed output from the speed estimation step by a predetermined amount, the control step includes a phase-lag compensation step of delaying the phase of the speed output from the phase-lead compensation step by a predetermined amount, and the pitch angle is calculated on the basis of the speed obtained after the phase-lag compensation. Accordingly, since the phase-lag of the output of the accelerometer can be compensated for and noise in the high-frequency band can be reduced, stable and effective damping control can be performed.

In the active damping method of a wind turbine generator of the present invention, the control step preferably includes a compensation step of performing any one of a proportional control, a proportional-integral control, a proportional-integral-derivative control, a control using a linear-quadratic regulator, and a control using a linear-quadratic Gaussian regulator for the speed estimated by the speed estimation step and calculates the pitch angle on the basis of the speed obtained after the compensation.

Thereby, stable and effective damping control can be performed.

In the active damping method of a wind turbine generator of the present invention, the active damping step preferably includes a limiting step of limiting the pitch angle of the windmill blades or the angular speed of the pitch angle of the windmill blades to a predetermined range.

According to this invention, fatigue of the pitch-angle control mechanism can be reduced, and problems due to errors in setting the parameters or the like can be prevented. Furthermore, when the blade-pitch-angle command for damping is limited to a much smaller range than the blade-pitch-angle command for output control, effects caused by interference of both command values can be decreased or prevented.

The wind turbine generator of the present invention can be suitably used for a windmill tower.

By applying the wind turbine generator of the present invention to a windmill tower, the cost of installing and operating the active damping control can be markedly reduced, and vibrations of the windmill tower can be reduced at low cost. Furthermore, unlike the known AMD method, since a heavy object (mass) and an actuator for the heavy object are not used, the weight of the nacelle does not increase and the strength of the windmill tower need not be increased. Thus, vibrations of the windmill tower can be reduced at low cost.

According to the wind turbine generator of the present invention, vibrations can be suppressed by an accelerometer, an active damping unit, and a pitch-angle control mechanism without using a heavy object and an actuator for driving the heavy object, which are used in the known AMD method.

Consequently, the cost of installing and operating the active damping control system can be markedly reduced, resulting in an advantage that vibrations of the wind turbine generator can be reduced at low cost.

BEST MODE FOR CARRYING OUT THE INVENTION

Embodiments of a wind turbine generator, an active damping method thereof, and a windmill tower of the present invention will now be described in detail with reference to the attached drawings.

Figure 1:
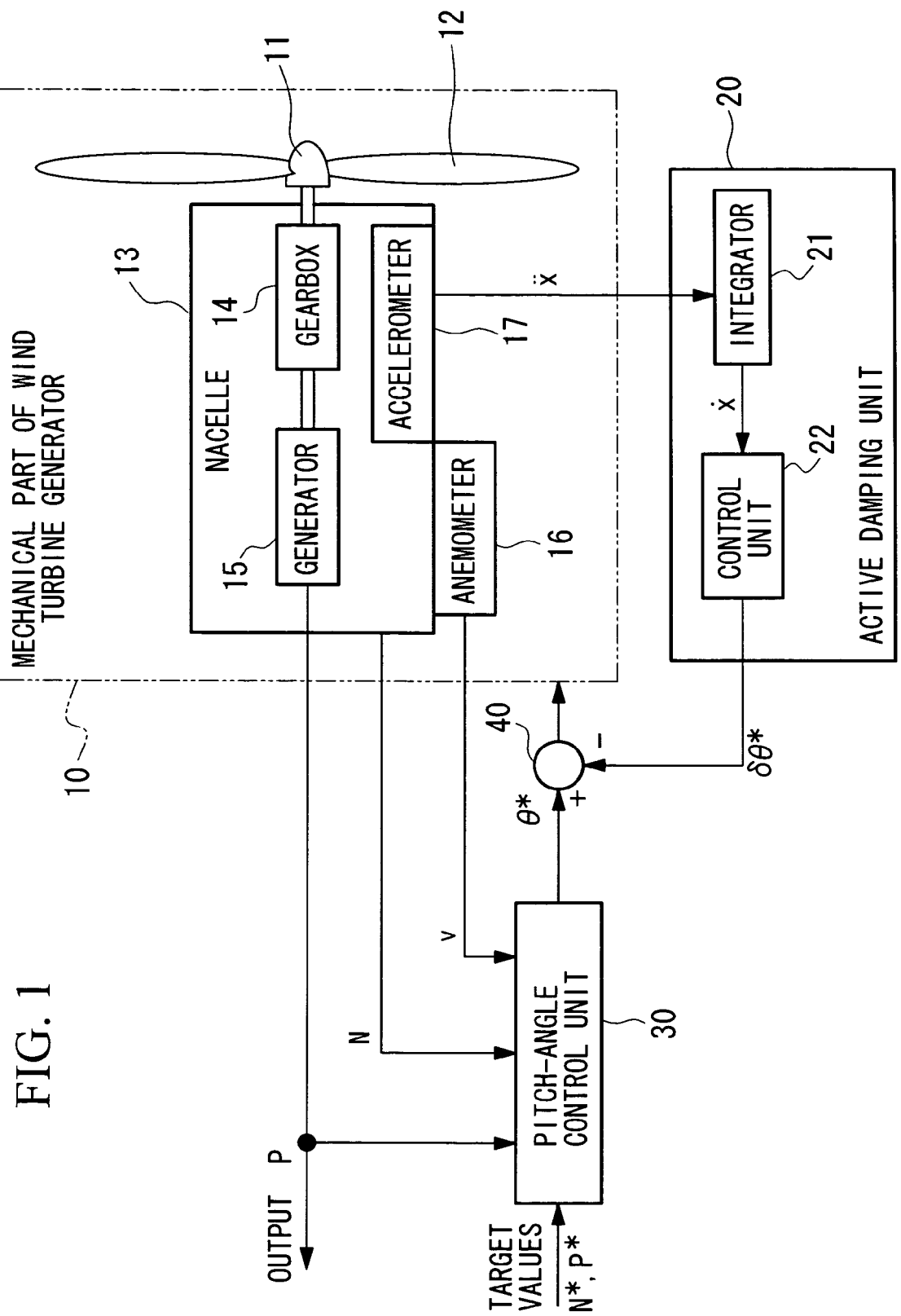
FIG. 1 is a diagram showing the configuration of a wind turbine generator according to an embodiment of the present invention.

FIG. 1 is a diagram showing the configuration of a wind turbine generator according to an embodiment of the present invention. In the figure, the wind turbine generator of this embodiment includes a mechanical part 10 of the wind turbine generator, an active damping unit 20, a pitch-angle control unit 30, and a subtracter 40. First, the outline of the components in the wind turbine generator of this embodiment will be described.

The mechanical part 10 of the wind turbine generator includes a windmill rotor 11, windmill blades 12, a nacelle 13, and an anemometer 16 as main components. The nacelle 13 includes a gearbox 14, a generator 15, and an accelerometer 17.

In the mechanical part 10 of the wind turbine generator, a plurality of windmill blades 12 attached to the windmill rotor 11 receive wind power energy and are rotated together with the windmill rotor 11. The speed is increased by the gearbox 14, and the generator 15 is then driven to generate electricity. Thus, the wind power energy is converted to electrical energy. In FIG. 1, the structure includes the gearbox 14, but a direct drive system that does not include the gearbox 14 may also be used.

The accelerometer 17, which is a feature of the wind turbine generator of this embodiment, is disposed inside the nacelle 13 and at a position close to the central part of the tower. The accelerometer 17 detects the acceleration due to vibrations in the front-rear direction of the nacelle 13.

The pitch-angle control unit 30 calculates a pitch angle of the windmill blades 12 for controlling an output P of this wind turbine generator to be a predetermined value on the basis of a wind speed v measured with the anemometer 16, a rotational speed N of the windmill rotor 11, or the output P of the wind turbine generator, and outputs the pitch angle as a blade-pitch-angle command θ* for output control. This output control by controlling the pitch angle has been performed in the known art, and the pitch-angle control unit 30 of this embodiment is the same as that of the known art.

The active damping unit 20 calculates a pitch angle of the windmill blades 12 for generating a thrust on the windmill blades 12 so as to cancel out vibrations of the nacelle 13 on the basis of the acceleration detected with the accelerometer 17, and outputs the pitch angle as a blade-pitch-angle command δθ* for damping.

The subtracter (adder) 40 combines the blade-pitch-angle command δθ* for damping obtained from the active damping unit 20 with the blade-pitch-angle command θ* for output control obtained from the pitch-angle control unit 30 and provides the result to the pitch-angle control mechanism as a blade-pitch-angle command. Here, the pitch-angle control mechanism (not shown in the figure) controls the pitch angle of the windmill blades 12 on the basis of the blade-pitch-angle command, and the structure thereof and the like are the same as those of the known art.

Next, the detailed structure of the active damping unit 20 and an active damping method for reducing vibrations of the wind turbine generator and the windmill tower using the active damping unit 20 will be described in detail.

Figure 2:
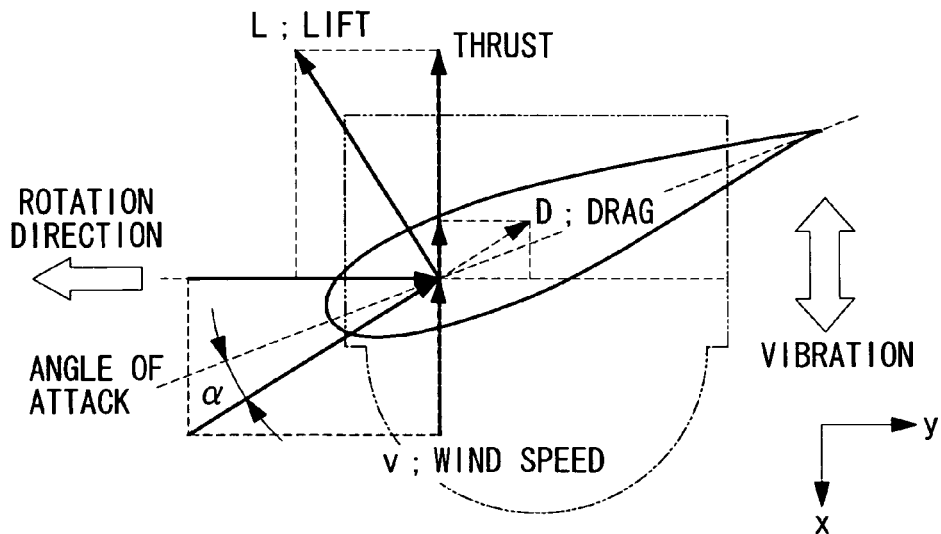
FIG. 2 is a view illustrating forces acting on a windmill blade.
Figure 3:
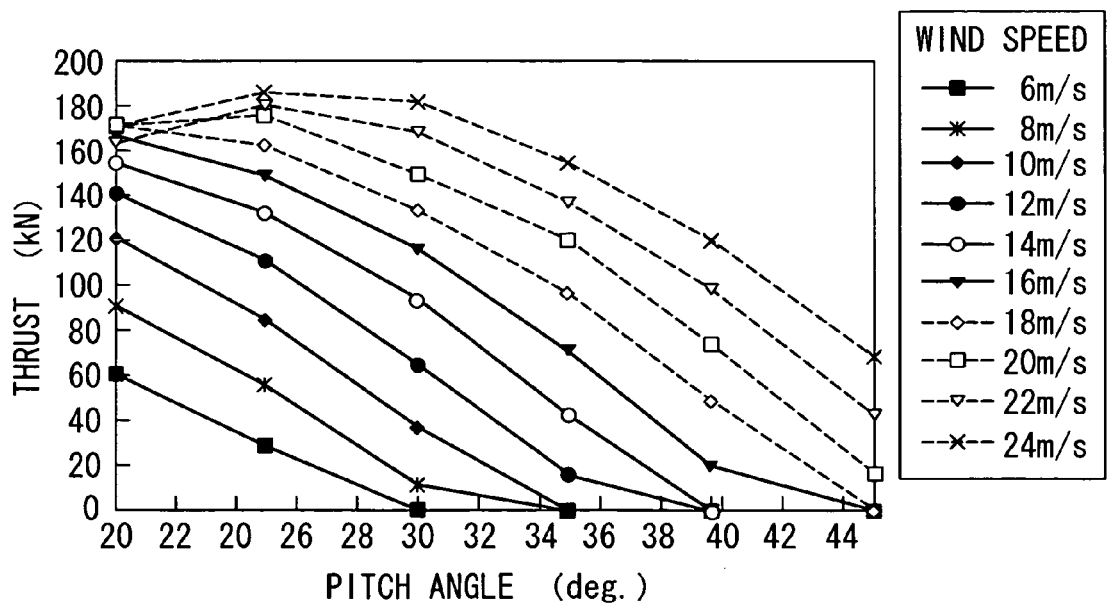
FIG. 3 is a graph showing an example of the relationship between the thrust and the pitch angle for a change in wind speed.

First, the basic principles of the active damping method will now be described with reference to FIGS. 2 and 3. FIG. 2 shows a cross-section of one of the windmill blades 12 (see FIG. 1) viewed from the leading end of the windmill blade 12 toward the base thereof, and illustrates forces acting on the windmill blade 12. In the figure, the rotation direction of the windmill blade is the direction from the right to the left, and the vibration direction of the wind turbine generator or the windmill tower is the vertical (x) direction. FIG. 3 is a graph showing an example of the relationship between the thrust and the pitch angle in the case where the wind speed v is varied from 6 to 24 [m/s].

As shown in FIG. 2, during the windmill operation, a lift L and a drag D act on the windmill blade. The drag D acts as a thrust in the front-rear direction of the nacelle 13 (see FIG. 1) of the windmill tower. As shown in FIG. 3, the magnitude of the thrust varies depending on the wind speed and the pitch angle. Accordingly, when the pitch angle is controlled on the basis of a control rule, by changing the thrust in the front-rear direction of the nacelle 13 of the windmill tower, vibrations in the front-rear direction of the nacelle 13 of the windmill tower can be controlled to some extent. The present invention focuses on this point, and the control rule of the pitch angle will be described below.

Figure 4:
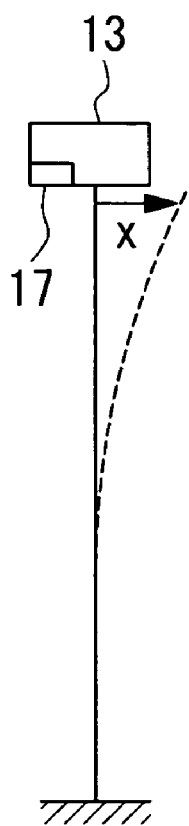
FIG. 4(a) is a schematic view of a windmill tower.
FIG. 4(b) is a schematic diagram in the case where the windmill tower is modeled as a mechanical vibration system.
Figure 4:
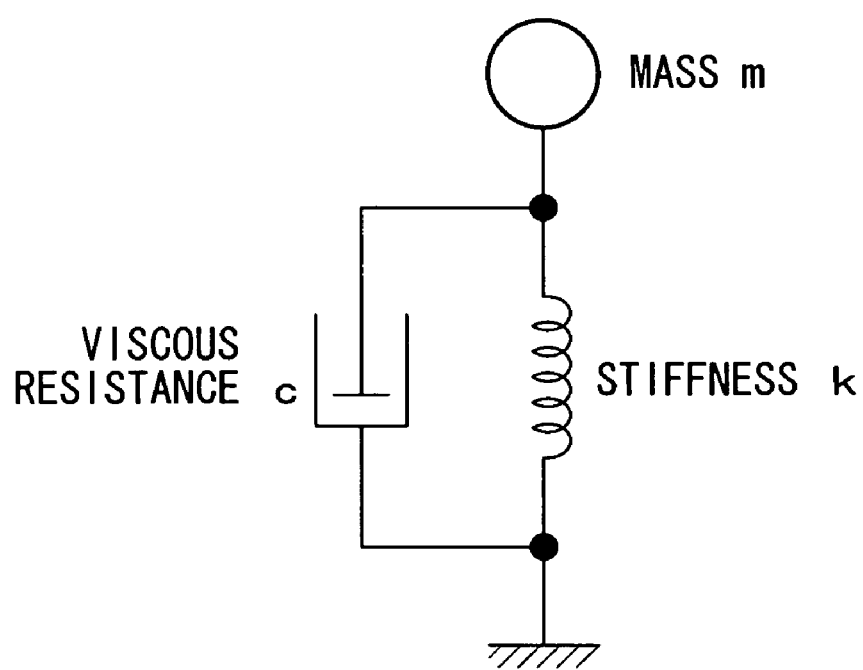

FIG. 4(a) is a schematic view of the windmill tower, and FIG. 4(b) is a schematic diagram in the case where the windmill tower is modeled as a mechanical vibration system. Specifically, FIG. 4(a) schematically shows that the accelerometer 17 is provided in the nacelle 13 of the windmill tower to detect acceleration ($d^2x/dt^2$) for a displacement x. As shown in FIG. 4(b), the windmill tower can be modeled using an object with a mass m, a spring with a stiffness k, and a dashpot with a viscous resistance c.

In this mechanical vibration system, when the displacement shifted from the equilibrium state is defined as x, the equation for the vibrations of the object is represented by equation (1):

$$m\ddot{x}+c\dot{x}+kx=f+\Delta f \quad (1)$$

In the equation, $f+\Delta f$ represents the force acting on the object, and $\Delta f$ represents an additional force exerted by the pitch control operation of the active damping unit 20.

Equation (1) is transformed into equation (2):

$$\ddot{x}+\frac{c}{m}\dot{x}+\frac{k}{m}x=\frac{1}{m}(f+\Delta f) \quad (2)$$

Here, a natural frequency ωn of the system and a damping factor ζ are represented as follows, and thus equation (2) can be rewritten as equation (5).

$$\omega n=(k/m)^{1/2} \quad (3)$$

$$\zeta=c/2(mk)^{1/2} \quad (4)$$

$$\ddot{x}+2\zeta\omega_n\dot{x}+\omega_n^2 x=\frac{1}{m}(f+\Delta f) \quad (5)$$

Furthermore, equation (5) is subjected to a Laplace transformation to derive equation (6)

$$s^2 X(s)+2\zeta\omega ns X(s)+\omega n^2 X(s)=(1/m)F(s) \quad (6)$$

From equation (6), a transfer function G(s) of the system is represented by equation (7):

$$G(s)=X(s)/F(s) \quad (7)$$
$$=(1/m)/(s^2+2\zeta\omega ns+\omega n^2)$$

In the second-order frequency response characteristics as in equation (7), referring to equations (3) and (4), the natural frequency ωn of the system can be changed by changing the mass m and the stiffness k; however, regarding the damping factor ζ, the effect of a change in the viscous resistance c is larger than the effect of changes in the mass m and the stiffness k.

On the other hand, in equation (1), the additional force $\Delta f$ is set, for example, as follows.

$$\Delta f=-Dp\dot{x} \quad (8)$$

In this case, equation (1) can be rewritten as equation (9).

$$m\ddot{x}+(C+Dp)\dot{x}+kx=f \quad (9)$$

That is, by setting the additional force $\Delta f$ exerted by the pitch control operation of the active damping unit 20 as represented by equation (8), the first-order term of equation (9) is increased by +Dp, and thus the damping factor ζ can be changed to a larger value. Consequently, damping of the vibrations can be performed more rapidly, and in the frequency response characteristics, a peak value of the gain of the natural frequency ωn can be suppressed more to suppress the vibration amplitude.

Figure 5:
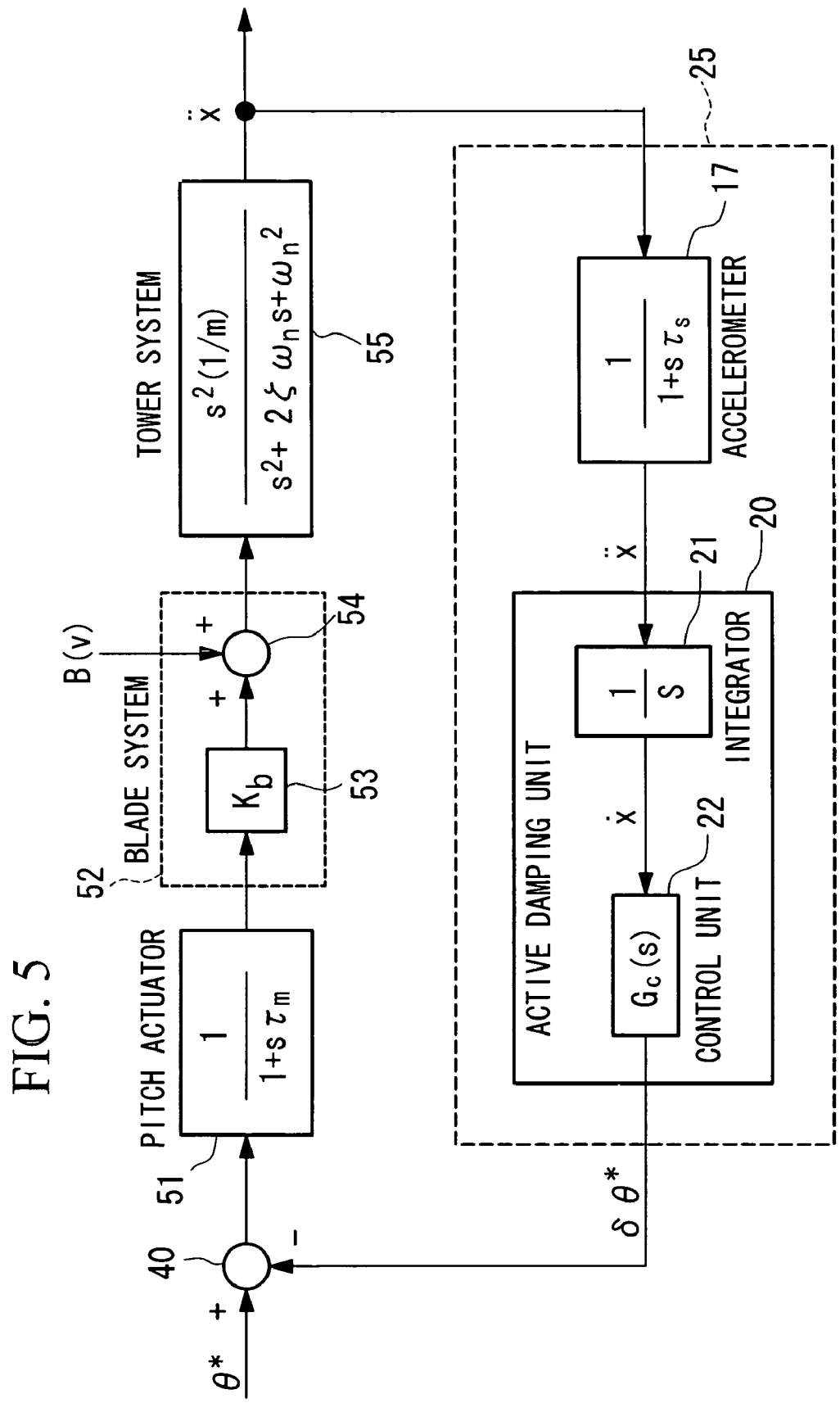
FIG. 5 is a block diagram of an active-damping control system according to an embodiment of the present invention.

Next, the specific structure and operation of the active damping control will be described in detail on the basis of the above-described basic principles of the active damping method. FIG. 5 is a block diagram of an active-damping control system according to this embodiment.

In FIG. 5, reference numeral 51 indicates a pitch actuator that drives the windmill blades 12 on the basis of the blade-pitch-angle command output from the subtracter 40 to control the pitch angle. The pitch actuator 51 is specifically realized by a hydraulic cylinder, an electric motor, or the like. Here, from the standpoint of the mechanical vibration system, the pitch actuator 51 is modeled by a first-order lag system.

Reference numeral 52 indicates a blade system that calculates the thrust acting on the windmill blades during the windmill operation. As shown in FIG. 2, since the thrust in the front-rear direction of the nacelle 13 of the windmill tower is the sum of the front-rear directional components of the lift L and the drag D, an adder 54 adds these components and outputs the result. Regarding the thrust due to the drag D, the pitch angle of the windmill blade 12 and the thrust have characteristics shown in FIG. 3. Accordingly, the thrust is considered to be in inverse proportion to the pitch angle, and is determined with an amplifier 53 having a gain of Kb based on a gradient obtained by linear approximation of the above relationship.

Reference numeral 55 indicates a tower system in which the windmill tower is modeled as a mechanical vibration system. The transfer function is determined by equation (7), but in the active-damping control system, the acceleration $(d^2x/dt^2)$ is detected with the accelerometer 17 and the result is fed back. Therefore, the modeling is performed using a transfer function obtained by multiplying equation (7) by $s^2$. This model is a model of only a first-order vibration mode.

A known wind turbine generator also has a structure including the above-described pitch actuator 51, the blade system 52, and the tower system 55. In this embodiment, the accelerometer 17, the active damping unit 20, and the subtracter 40 are added to these components to form a feedback loop. The accelerometer 17 detects acceleration, which is the output of the tower system 55. The active damping unit 20 generates the blade-pitch-angle command δθ* for damping used for changing the thrust in the front-rear direction of the nacelle 13 of the windmill tower. The subtracter 40 performs a calculation of δθ* −θ* so as to combine the blade-pitch-angle command δθ* for damping obtained from the active damping unit 20 with the blade-pitch-angle command θ* for output control output from the pitch-angle control unit 30.

The accelerometer 17 is modeled by a first-order lag system because the output thereof includes a phase lag. In the active damping unit 20, as set in equation (8), a value obtained by multiplying the speed (dx/dt) by Dp is defined as the additional force exerted by the pitch control operation of the active damping unit 20. Therefore, the active damping unit 20 includes an integrator 21 that integrates the acceleration to determine the speed, and a control unit 22 having a transfer function Gc(s).

Specifically, the acceleration (first-order vibration mode) in the front-rear direction of the nacelle 13 is measured with the accelerometer 17 provided inside the nacelle 13, the measured acceleration is input to the active damping unit 20, and the speed in the front-rear direction of the nacelle 13 is calculated by an integration operation by the integrator 21. In the control unit 22 of the active damping unit 20, the blade-pitch-angle command δθ* for damping used for obtaining the damping effect is calculated on the basis of the calculated speed. The blade-pitch-angle command δθ* for damping determined in the active damping unit 20 is combined, by the subtracter 40, with the blade-pitch-angle command θ* for output control determined in the pitch-angle control unit 30 (see FIG. 1). The pitch actuator 51 drives the windmill blades 12 on the basis of the combined blade-pitch-angle command to control the pitch angle. This pitch-angle control controls the output of the wind turbine generator. In addition, a thrust according to the pitch angle acts so as to suppress vibrations in the front-rear direction of the nacelle 13 of the windmill tower. Thus, the thrust allows the vibrations to be rapidly damped.

Thus, in this embodiment, by combining the blade-pitch-angle command δθ* for damping with the blade-pitch-angle command θ* for output control, output control and damping control can be achieved at the same time. The integrator 21, which calculates the speed, not only performs the integration operation but also has a frequency characteristic that relatively suppresses a high-frequency band and emphasizes a low-frequency band. Accordingly, the integrator 21 also has a function of cutting noise in the high-frequency band.

The structure of the integrator is not limited to the complete integral (1/s). Alternatively, the integrator may be a filter (for example, a first-order lag element) having the same function as that of the above, an appropriate state estimator (a full-order or minimal-order observer, or a Kalman filter), or the like.

Next, the specific structure and operation of the control unit 22 of the active damping unit 20 will now be described with reference to FIGS. 6(a) and 6(b). FIGS. 6(a) and 6(b) are block diagrams each showing an example of the structure of the control unit 22 of the active damping unit 20.

In FIG. 6(a), a control unit 22a includes a phase-lead compensator 62, a phase-lag compensator 63, as amplifier 64, and a limiter 65.

As described above, since the output of the accelerometer 17 includes a phase lag, the phase-lead compensator 62 adjusts the phase. As shown in the figure, the phase-lead compensator 62 has a transfer function of a phase-lead system represented by $(1+s\alpha T1)/(1+sT1)$ (wherein $\alpha<1$).

When the output passes through the phase-lead compensator 62, noise in the high-frequency band is amplified. Therefore, the phase-lag compensator 63 is added as a countermeasure, thereby relatively suppressing the high-frequency band and emphasizing the low-frequency band. As shown in the figure, the phase-lag compensator 63 has a transfer function of a phase-lag system represented by $(1+s\alpha T2)/(1+sT2)$ (wherein $\alpha>1$). Thus, the control unit 22 of the active damping unit 20 includes two types of filter, i.e., the phase-lead compensator 62 and the phase-lag compensator 63, thereby compensating for the phase-lag of the output of the accelerometer 17 and reducing noise in the high-frequency band. Therefore, stable and effective damping control can be performed.

In addition, according to equation (8), the amplifier 64 is configured to have a transfer function of a gain Dp. In this case, the gain Dp is preferably set on the basis of the result of a simulation, an experiment, or the like.

The structure of the control unit 22 (see FIG. 5) is not limited to the above-described phase compensators. Alternatively, the control unit 22 can be realized using, for example, a proportional controller, a proportional-integral controller, a proportional-integral-derivative controller, a linear-quadratic regulator (LQ regulator), or a linear-quadratic Gaussian regulator (LQG regulator).

When the pitch-angle control by the blade-pitch-angle command δθ* for damping is performed too frequently, the pitch-angle control mechanism is excessively moved, resulting in fatigue. Therefore, a limit (for example, ±1 [deg]) is preferably provided for the blade-pitch-angle command δθ* for damping by the limiter 65 (see FIGS. 6(a) and 6(b)), thereby reducing fatigue of the pitch-angle control mechanism.

Figure 6:
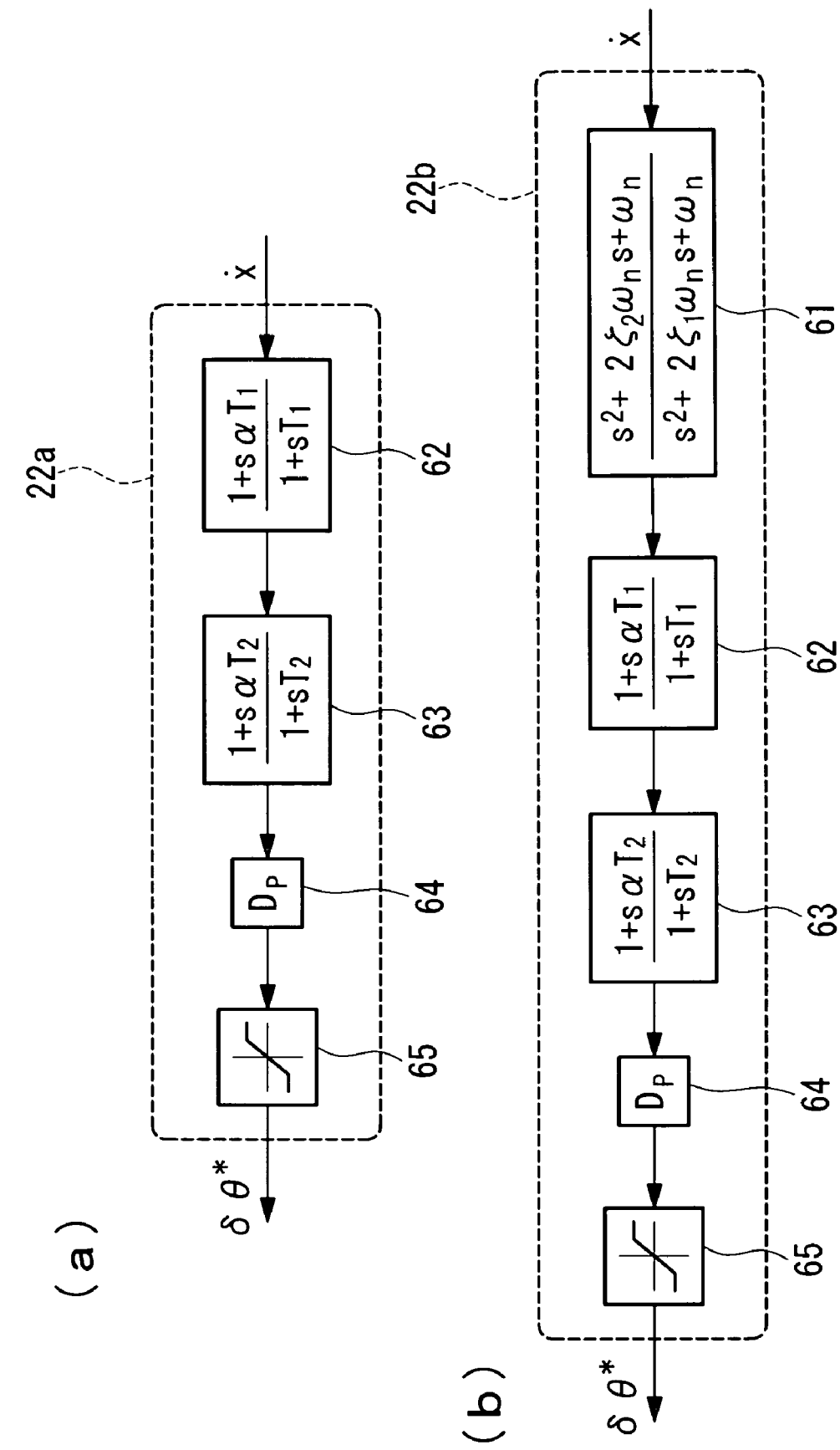
FIG. 6 includes block diagrams each showing an example of the structure of a control unit of an active damping unit.

Specifically, when the output (hereinafter referred to as "pitch-angle command") of the amplifier 64 shown in FIG. 6 is smaller than a predetermined minimum pitch-angle ("YES" in step SA1 in FIG. 7), the minimum pitch-angle or a predetermined pitch-angle larger than the minimum pitch-angle is output as the final blade-pitch-angle command δθ* for damping (step SA2 in FIG. 7). On the other hand, when the pitch-angle command is equal to or larger than the minimum pitch-angle ("NO" in step SA1 in FIG. 7), it is determined whether or not the pitch-angle command is larger than a predetermined maximum pitch-angle (step SA3 in FIG. 7).

Figure 7:
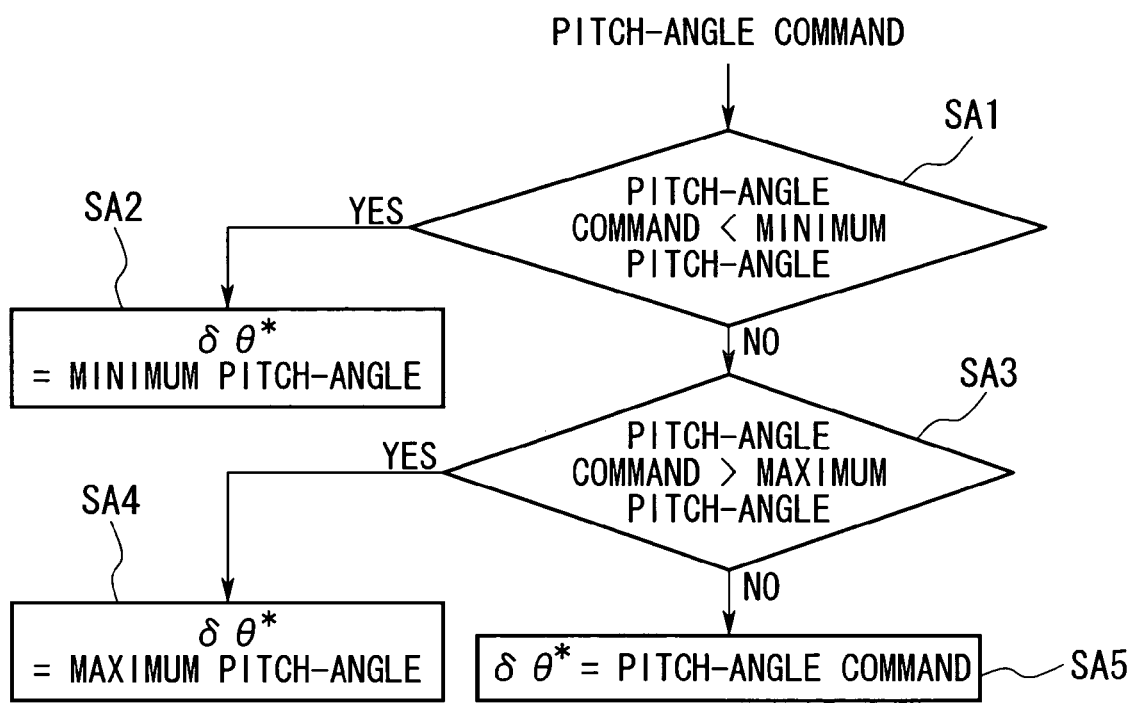
FIG. 7 is a flow chart showing an example of the details of the control of a limiter shown in FIG. 6.

As a result, when the pitch-angle command is larger than the maximum pitch-angle ("YES" in step SA3 in FIG. 7), the maximum pitch-angle or a predetermined pitch-angle smaller than the maximum pitch-angle is output as the final blade-pitch-angle command δθ* for damping (step SA4 in FIG. 7). On the other hand, when the pitch-angle command is equal to or smaller than the maximum pitch-angle ("NO" in step SA3 in FIG. 7), the pitch-angle is output as the final blade-pitch-angle command δθ* for damping (step SA5 in FIG. 7).

As described above, instead of limiting the output of the amplifier 64 itself (see FIGS. 6(a) and 6(b)), the rate of change of this output, that is, the angular speed of the pitch angle, may be limited to a certain range (for example, ±0.6 [deg/sec]).

Figure 8:
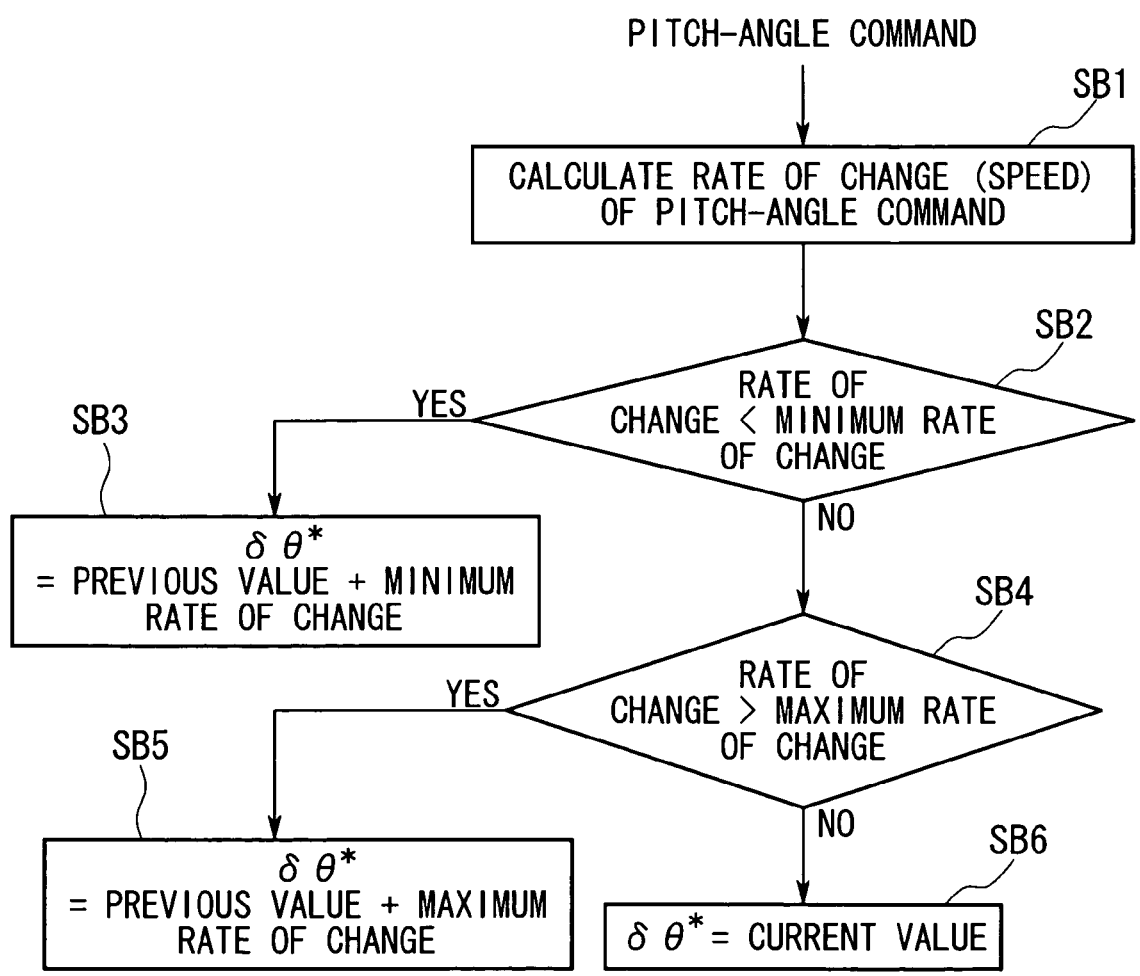
FIG. 8 is a flow chart showing an example of the details of the control of the limiter shown in FIG. 6.

Specifically, as shown in FIG. 8, a rate of change is first calculated on the basis of the previous value (hereinafter referred to as "previous value of pitch-angle command") and a current value (hereinafter referred to as "current value of pitch-angle command") of the output of the amplifier 64 (see FIG. 6) (step SB1). Subsequently, it is determined whether or not the rate of change is smaller than a predetermined minimum rate of change (step SB2). As a result, when the rate of change is smaller than the predetermined minimum rate of change ("YES" in step SB2), a value calculated by adding the minimum rate of change to the previous value of pitch-angle command is output as the final blade-pitch-angle command δθ* for damping (step SB3).

On the other hand, when the rate of change is equal to or larger than the minimum rate of change ("NO" in step SB2), it is determined whether or not the rate of change is larger than a predetermined maximum rate of change (step SB4). As a result, when the rate of change is larger than the maximum rate of change ("YES" in step SB4), a value calculated by adding the maximum rate of change to the previous value of pitch-angle command is output as the final blade-pitch-angle command δθ* for damping (step SB5). On the other hand, when the rate of change is equal to or smaller than the maximum rate of change ("NO" in step SB4), the current value of pitch-angle command is output as the final blade-pitch-angle command δθ* for damping (step SB6).

As described above, limiting the blade-pitch-angle command δθ* for damping or the rate of change of the pitch-angle command δθ* can prevent a problem where, for example, vibrations of the windmill tower are instead increased because of errors in setting the parameters of the vibration control system or the like.

Furthermore, since the blade-pitch-angle command δθ* for damping is limited to a much smaller range than the blade-pitch-angle command θ* for output control, effects caused by interference of both command values can be decreased or prevented.

In a control unit 22b shown in FIG. 6(b), a second-order oscillatory compensator 61 is added to the previous stage of the phase-lead compensator 62 of the control unit 22a to realize more precise control.

In the above description, the active damping unit 20 is composed of hardware and outputs the blade-pitch-angle command δθ* for damping. Alternatively, each component may be composed of a subprogram that is sequentially executed. In this case, the integrator 20 is replaced with an integration step (speed estimation step) and the control unit 22 is replaced with a control step. Components in the control unit 22 are also replaced with a phase-lead compensation step, a phase-lag compensation step, a limiting step, and the like. These steps forms a subprogram executed in a central processing unit (CPU), a micro processing unit (MPU), or a digital signal processor (DSP) in a controller.

Next, the output control using the pitch-angle control unit 30 (see FIG. 1) will be briefly described with reference to FIG. 9, which shows a block diagram of a control system in the case where the above-described active-damping control system using the active damping unit 20 is installed in an output control system, realized in a known wind turbine generator, that uses the pitch-angle control unit 30.

Figure 9:
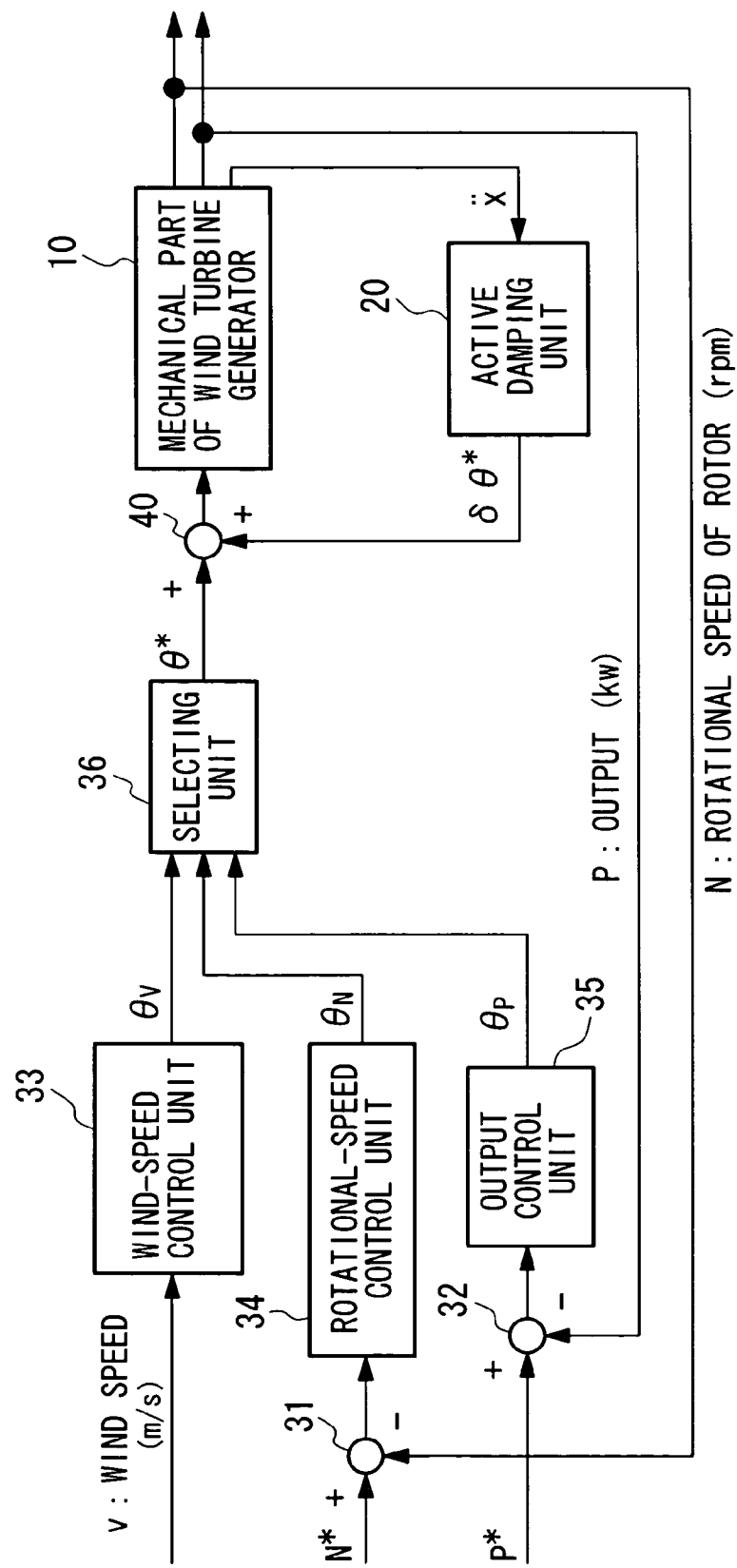
FIG. 9 is a block diagram of a control system in the case where the active-damping control system is installed in an output control system.

In FIG. 9, the pitch-angle control unit includes subtracters 31 and 32, a wind-speed control unit 33, a rotational-speed control unit 34, an output control unit 35, and a selecting unit 36.

The wind-speed control unit 33 sets a blade-pitch-angle command $\theta_v$ on the basis of a wind speed v [m/s] measured with the anemometer 16 and outputs the command. The rotational-speed control unit 34 sets a blade-pitch-angle command $\theta_N$ so as to provide a predetermined rotational speed (target value) N* on the basis of a rotational speed N [rpm] of the windmill rotor 11 and outputs the command. Furthermore, the output control unit 35 sets a blade-pitch-angle command $\theta_P$ so as to provide a predetermined output (target value) P* on the basis of an output P [kW] of the wind turbine generator and outputs the command.

Figure 10:
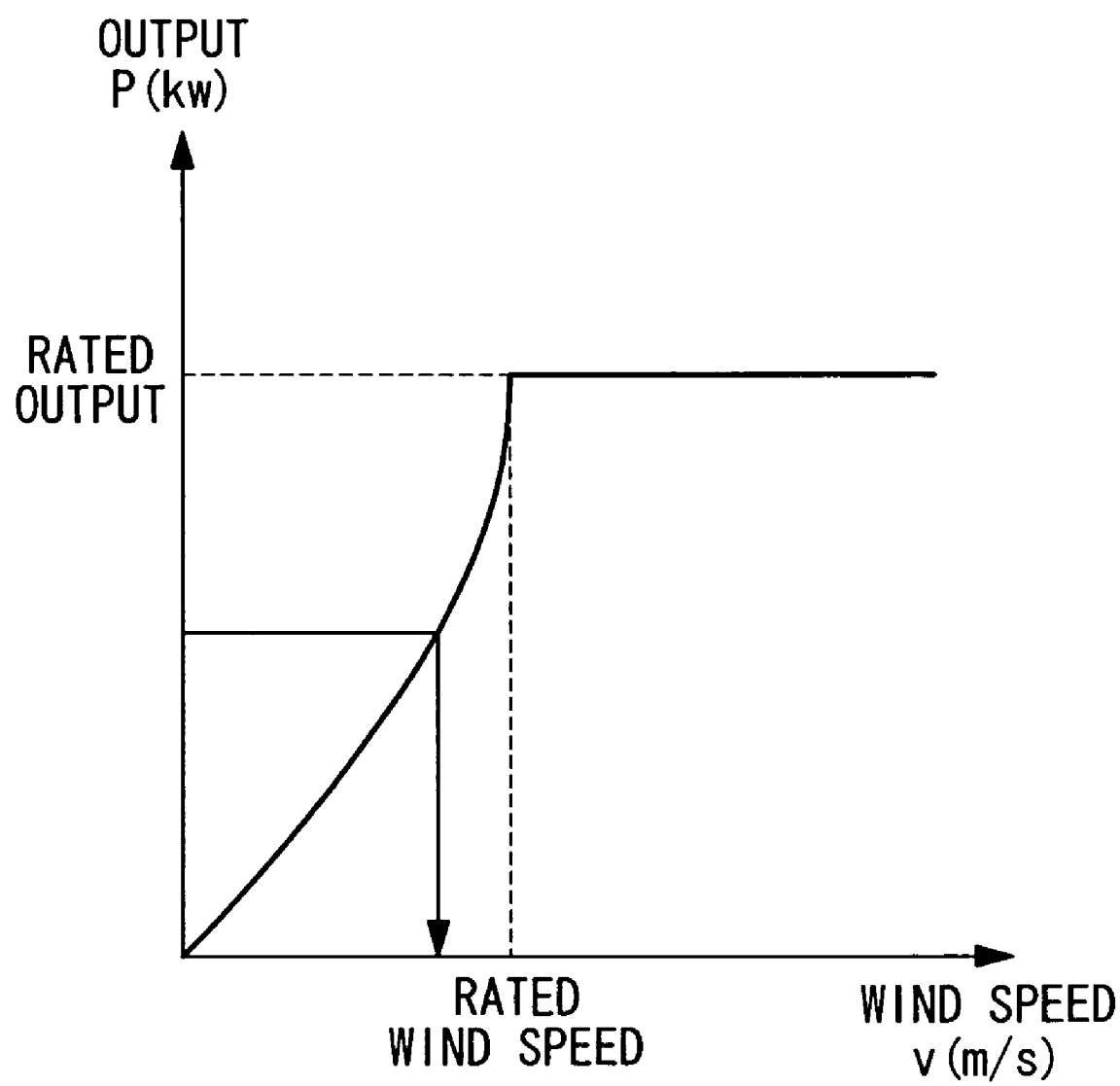
FIG. 10 is a graph showing the characteristic of output from a windmill generator versus wind speed.

In the selecting unit 36, among the blade-pitch-angle commands $\theta_v$, $\theta_N$, and $\theta_P$ determined in the wind-speed control unit 33, the rotational-speed control unit 34, and the output control unit 35, respectively, the minimum value is selected (minimum selection), that is, a blade-pitch-angle command that produces the lowest output is selected, and is output as a blade-pitch-angle command θ* for output control. In general, characteristics between the output P [kW] of the windmill generator and wind speed v [m/s] are illustrated as shown in FIG. 10. Control is performed on the basis of the wind speed v [m/s] until a rated output and a rated wind speed are achieved. After reaching the rated output and the rated wind speed, control is performed on the basis of the rotational speed N [rpm] of the windmill rotor 11 or the output P [kW] of the wind turbine generator.

The control range of the pitch angle by the pitch-angle control unit 30 is large and ranges from a fine pitch (which is about −20 [deg] and at which the rotational speed is high) to a feathering pitch (which is about −104 [deg] and at which the rotational speed is low).

Figure 11:
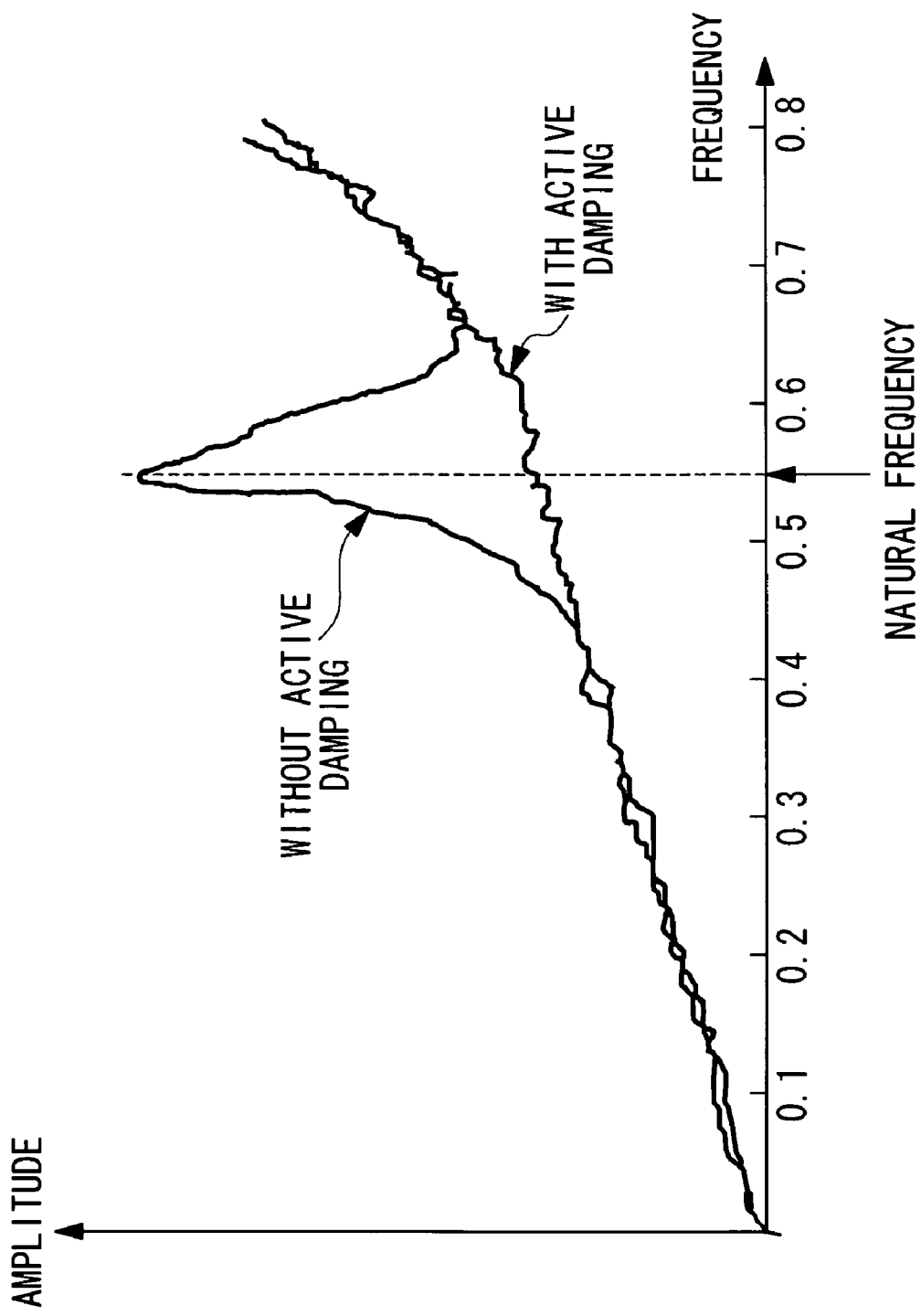
FIG. 11 is a graph showing an example of the frequency characteristic of the vibration amplitude in a tower system in cases where the active damping is performed and is not performed by the active damping unit.

Next, the advantage of the wind turbine generator and the active damping method thereof according to this embodiment will be described with reference to example results of a simulation experiment. FIG. 11 shows a frequency characteristic of the vibration amplitude in the tower system 55 (see FIG. 5) in cases where the active damping is performed and is not performed by the active damping unit 20 (see FIG. 1). The figure shows that the vibration amplitude is substantially suppressed near the natural frequency of the tower system 55.

Since the natural frequency of the tower system 55 is known in advance, more appropriate vibration control can be realized by setting parameters of the control system in accordance with the natural frequency.

As described above, in the wind turbine generator or the active damping method thereof according to this embodiment, as shown in FIG. 1, the acceleration due to vibrations of the nacelle 13 is detected with the accelerometer 17 attached to the nacelle 13, a pitch angle of the windmill blades 12 for generating a thrust on the windmill blades 12 so as to cancel out the vibrations of the nacelle 13 is calculated in the active damping unit 20 (active damping step) on the basis of the acceleration, and the pitch angle is output as a blade-pitch-angle command δθ* for damping. On the other hand, a pitch angle of the windmill blades 12 for controlling the output to be a predetermined value is calculated in the pitch-angle control unit 30 (pitch-angle control step), and the pitch angle is output as a blade-pitch-angle command θ* for output control. Subsequently, the blade-pitch-angle command δθ* for damping is combined with the blade-pitch-angle command θ* for output control using the subtracter 40 (addition step), and the pitch angle of the windmill blades is controlled on the basis of the resulting blade-pitch-angle command after combining.

Since the technique of pitch-angle control has been widely employed to date for the purpose of output control, this embodiment can be realized by merely additionally mounting the accelerometer 17, the active damping unit 20 (active damping step), and the subtracter 40 (addition step) on an existing wind turbine generator. Since the mounting can be easily performed, the cost of installing and operating the active damping control can be markedly reduced, and thus vibrations of the wind turbine generator can be reduced at low cost. Furthermore, since the pitch-angle control is performed by combining the blade-pitch-angle command δθ* for damping with the blade-pitch-angle command θ* for output control, output control and damping control can be achieved at the same time.

In the wind turbine generator of this embodiment or the active damping method thereof, as shown in FIG. 1, in the active damping unit 20 (active damping step), the acceleration detected by the accelerometer is integrated with the integrator 21 (integration step) to determine the speed, and a pitch angle of the windmill blades for generating a thrust on the windmill blades so as to cancel out vibrations of the nacelle is calculated by the control unit 22 (control step) on the basis of the speed. Thus, according to the present invention, since the active damping unit 20 (active damping step) can be realized using a simple structure, i.e., the integrator 21 (integration step) and the control unit 22 (control step), vibrations of the wind turbine generator can be reduced at low cost. Furthermore, since noise in the high-frequency band can be removed through the integrator 21 (integration step), stable and effective damping control can be performed.

According to the wind turbine generator of this embodiment or the active damping method thereof, as shown in FIGS. 1, 6(a), and 6(b), the control unit 22 (control step) includes the phase-lead compensator 62 (phase-lead compensation step) that advances the phase of the speed output from the integrator 21 (integration step) by a predetermined amount and the phase-lag compensator 63 (phase-lag compensation step) that delays the phase of the speed output from the phase-lead compensator 62 (phase-lead compensation step) by a predetermined amount, and calculates a pitch angle on the basis of the speed obtained after the phase-lag compensation. Thereby, the phase-lag of the output of the accelerometer can be compensated for and noise in the high-frequency band can be reduced, and thus stable and effective damping control can be performed.

According to the wind turbine generator of this embodiment or the active damping method thereof, as shown in FIGS. 6(a) and 6(b), the control unit 22 (control step) includes the limiter 65 (limiting step) that limits the calculated pitch angle to a predetermined range. Therefore, fatigue of the pitch-angle control mechanism can be reduced, and problems due to errors in setting the parameters or the like can be prevented. Furthermore, when the blade-pitch-angle command δθ* for damping is limited to a much smaller range than the blade-pitch-angle command θ* for output control, effects caused by interference of both command values can be reduced or prevented.

The embodiments of the present invention have been described in detail with reference to the drawings. However, the specific structures are not limited to the embodiments, and also include design changes that do not depart from the essence of the present invention.

In the above description of the embodiments, the wind turbine generator and the active damping method thereof have been described in detail. The wind turbine generator of the embodiments and the active damping method thereof can be directly applied to a windmill tower without modification. In this case, in addition to the above-described advantages, the following advantages are also provided. Namely, unlike the known AMD method, since a heavy object (mass) and an actuator for the heavy object are not used, the weight of the nacelle 13 does not increase and the strength of the windmill tower itself need not be increased. Thus, the vibrations of the windmill tower can be reduced at low cost.

In the embodiments, the output control is performed by the pitch-angle control. However, the present invention can also be applied to a wind turbine generator or a windmill tower that employs other output controls. In this case, however, a pitch-angle control mechanism that controls the pitch angle of the windmill blades 12 must be added.

Furthermore, in the actual operation, from the standpoint of increasing reliability and safety, the following structure or the method can also be employed.

In an example of the method, two accelerometers constantly operate inside the nacelle 13 for fail-safe operation, and only the detection result obtained from one of the accelerometers is used for the active damping control. If either of the accelerometers breaks down, the active damping control is automatically stopped.

When set values of parameters (mainly a feedback gain Gc(s)) of the damping control system are not appropriate, for example, when the sign is inverted or a high gain exceeding the tolerance limit is set, the damping control system becomes unstable, resulting in an increase in vibrations of the windmill tower (nacelle 13). In an example of the method, such a state is automatically detected (with the accelerometer 17 or the like) to automatically stop the active damping control.

The invention claimed is:

1. A wind turbine generator including a pitch-angle control mechanism for controlling a pitch angle of windmill blades on the basis of a blade-pitch-angle command, the wind turbine generator comprising:
   an accelerometer, attached to a nacelle, for detecting the acceleration due to vibrations of the nacelle; and
   an active damping unit for calculating a pitch angle of the windmill blades for generating a thrust on the windmill blades so as to cancel out the vibrations of the nacelle on the basis of the acceleration detected with the accelerometer and for outputting a blade-pitch-angle command to the pitch-angle control mechanism,
   wherein the active damping unit includes
   a speed estimation unit for estimating a speed from the acceleration detected with the accelerometer; and
   a control unit for calculating a pitch angle of the windmill blades for generating a thrust on the windmill blades so as to cancel out the vibrations of the nacelle on the basis of the speed output from the speed estimation unit; and
   wherein the control unit includes a phase-lead compensator for advancing the phase of the speed output from the speed estimation unit by a predetermined amount, and calculates the pitch angle on the basis of the speed obtained after the phase-lead compensation.

2. A wind turbine generator including a pitch-angle control mechanism for controlling a pitch angle of windmill blades on the basis of a blade-pitch-angle command, the wind turbine generator comprising:
   an accelerometer, attached to a nacelle, for detecting the acceleration due to vibrations of the nacelle;
   an active damping unit for calculating a pitch angle of the windmill blades for generating a thrust on the windmill blades so as to cancel out the vibrations of the nacelle on the basis of the acceleration detected with the accelerometer and for outputting a blade-pitch-angle command for damping;
   a pitch-angle control unit for calculating a pitch angle of the windmill blades for controlling the output of the wind turbine generator to be a predetermined value on the basis of wind speed, the rotational speed of a windmill rotor, or the output of the wind turbine generator and for outputting a blade-pitch-angle command for output control; and
   an adder for supplying the pitch-angle control mechanism with a blade-pitch-angle command obtained by combining the blade-pitch-angle command for damping output from the active damping unit with the blade-pitch-angle command for output control output from the pitch-angle control unit,
   wherein the active damping unit includes
   a speed estimation unit for estimating a speed from the acceleration detected with the accelerometer; and
   a control unit for calculating a pitch angle of the windmill blades for generating a thrust on the windmill blades so as to cancel out the vibrations of the nacelle on the basis of the speed output from the speed estimation unit; and
   wherein the control unit includes a phase-lead compensator for advancing the phase of the speed output from the speed estimation unit by a predetermined amount, and calculates the pitch angle on the basis of the speed obtained after the phase-lead compensation.

3. The wind turbine generator according to claim 1 or 2, wherein the speed estimation unit integrates the acceleration detected with the accelerometer to calculate the speed.

4. The wind turbine generator according to claim 1 or 2, wherein the control unit includes a phase-lag compensator for delaying the phase of the speed output from the phase-lead compensator by a predetermined amount, and calculates the pitch angle on the basis of the speed obtained after the phase-lag compensation.

5. The wind turbine generator according to claim 1 or 2, wherein the control unit includes any one of a proportional controller, a proportional-integral controller, a proportional-integral-derivative controller, a linear-quadratic regulator, and a linear-quadratic Gaussian regulator to which the speed estimated by the speed estimation unit is input to calculate the pitch angle.

6. The wind turbine generator according to claim 1 or 2, wherein the active damping unit includes a limiter for limiting the pitch angle of the windmill blades or the angular speed of the pitch angle of the windmill blades to a predetermined range.

7. An active damping method of a wind turbine generator including
a pitch-angle control mechanism for controlling a pitch angle of windmill blades on the basis of a blade-pitch-angle command, and
an accelerometer, attached to a nacelle, for detecting the acceleration due to vibrations of the nacelle, the active damping method comprising:
an active damping step of calculating a pitch angle of the windmill blades for generating a thrust on the windmill blades so as to cancel out the vibrations of the nacelle on the basis of the acceleration detected with the accelerometer and outputting a blade-pitch-angle command to the pitch-angle control mechanism;
wherein the active damping step includes
a speed estimation step of estimating a speed from the acceleration detected with the accelerometer; and
a control step of calculating a pitch angle of the windmill blades for generating a thrust on the windmill blades so as to cancel out the vibrations of the nacelle on the basis of the speed estimated in the speed estimation step; and
wherein the control step includes a phase-lead compensation step of advancing the phase of the speed estimated by the speed estimation step by a predetermined amount and calculates the pitch angle on the basis of the speed obtained after the phase-lead compensation.

8. An active damping method of a wind turbine generator including
a pitch-angle control mechanism for controlling a pitch angle of windmill blades on the basis of a blade-pitch-angle command, and
an accelerometer, attached to a nacelle, for detecting the acceleration due to vibrations of the nacelle, the active damping method comprising:
an active damping step of calculating a pitch angle of the windmill blades for generating a thrust on the windmill blades so as to cancel out the vibrations of the nacelle on the basis of the acceleration detected with the accelerometer and outputting a blade-pitch-angle command for damping;
a pitch-angle control step of calculating a pitch angle of the windmill blades for controlling the output of the wind turbine generator to be a predetermined value on the basis of wind speed, the rotational speed of a windmill rotor, or the output of the wind turbine generator and outputting a blade-pitch-angle command for output control; and
an addition step of supplying the pitch-angle control mechanism with a blade-pitch-angle command obtained by combining the blade-pitch-angle command for damping in the active damping step with the blade-pitch-angle command for output control in the pitch-angle control steps;
wherein the active damping step includes:
a speed estimation step of estimating a speed from the acceleration detected with the accelerometer; and
a control step of calculating a pitch angle of the windmill blades for generating a thrust on the windmill blades so as to cancel out the vibrations of the nacelle on the basis of the speed estimated in the speed estimation step; and
wherein the control step includes a phase-lead compensation step of advancing the phase of the speed estimated by the speed estimation step by a predetermined amount and calculates the pitch angle on the basis of the speed obtained after the phase-lead compensation.

9. The active damping method according to claim 7 or 8, wherein the speed estimation step integrates the acceleration detected with the accelerometer to calculate the speed.

10. The active damping method of a wind turbine generator according to claim 7 or 8, wherein the control step includes a phase-lag compensation step of delaying the phase of the speed output from the phase-lead compensation step by a predetermined amount and calculates the pitch angle on the basis of the speed obtained after the phase-lag compensation.

11. The active damping method of a wind turbine generator according to claim 7 or 8, wherein the control step includes a compensation step of performing any one of a proportional control, a proportional-integral control, a proportional-integral-derivative control, a control using a linear-quadratic regulator, and a control using a linear-quadratic Gaussian regulator for the speed estimated by the speed estimation step and calculates the pitch angle on the basis of the speed obtained after the compensation.

12. The active damping method of a wind turbine generator according to claim 7 or 8, wherein the active damping step includes a limiting step of limiting the pitch angle of the windmill blades or the angular speed of the pitch angle of the windmill blades to a predetermined range.

13. A windmill tower comprising the wind turbine generator according to claim 1 or 2.

* * * * *